J. TRIMMER.
TRACTOR.
APPLICATION FILED JULY 29, 1919.

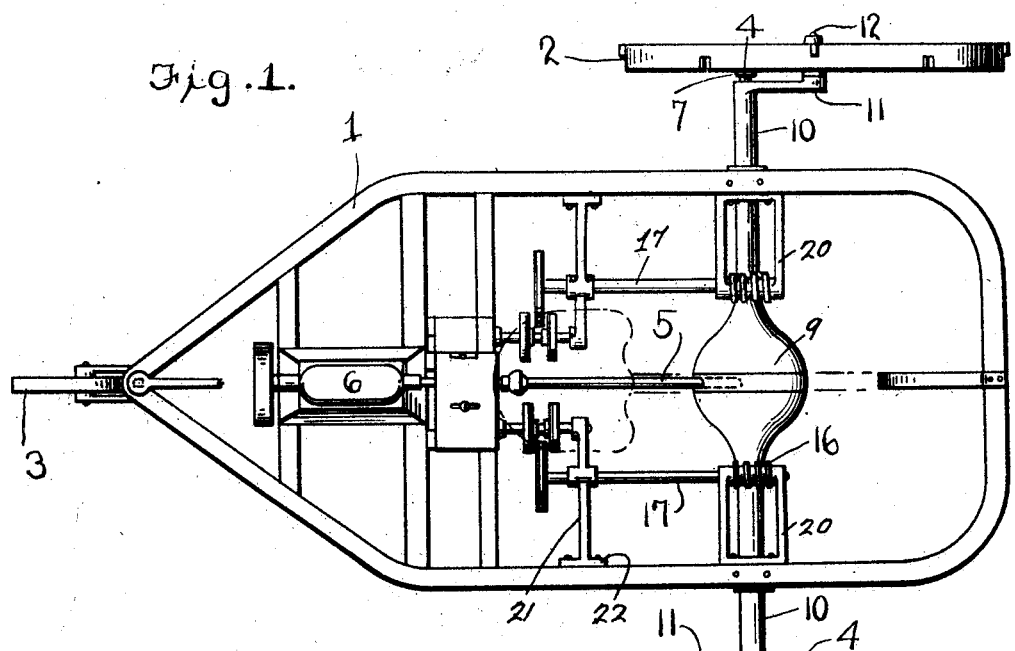
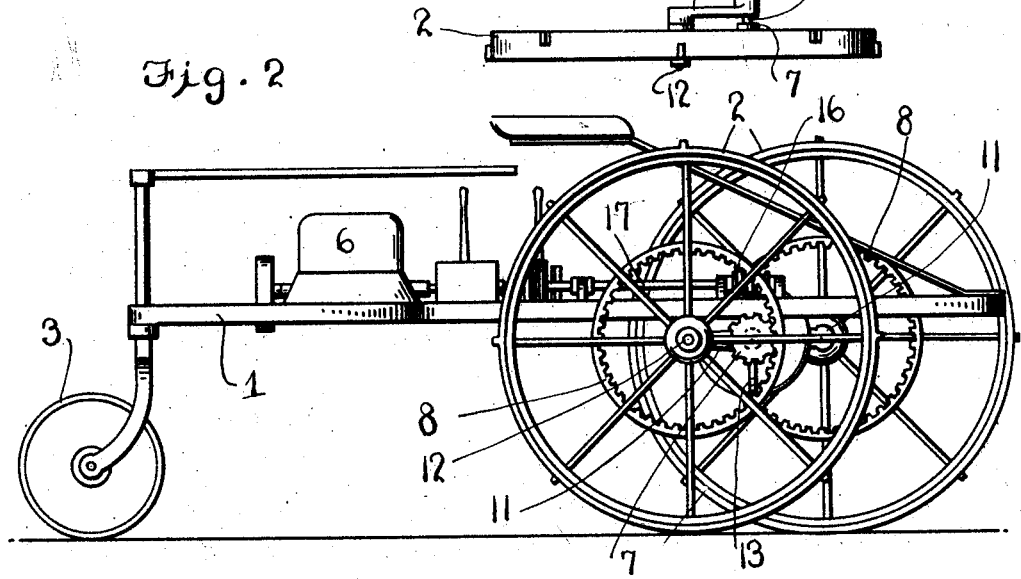

1,374,784.

Patented Apr. 12, 1921.
2 SHEETS—SHEET 2.

Jesse Trimmer
INVENTOR.

WITNESS:
L. B. James

BY
Victor J. Evans
ATTORNEY.

UNITED STATES PATENT OFFICE.

JESSE TRIMMER, OF TRAVERSE CITY, MICHIGAN.

TRACTOR.

1,374,784.  Specification of Letters Patent.  Patented Apr. 12, 1921.

Application filed July 29, 1919. Serial No. 314,037.

*To all whom it may concern:*

Be it known that I, JESSE TRIMMER, a citizen of the United States, residing at Traverse City, in the county of Grand Traverse and State of Michigan, have invented new and useful Improvements in Tractors, of which the following is a specification.

My invention relates to farm tractors and the main object thereof is to provide means enabling one of the driving or traction wheels of the machine to be raised and the other lowered in relation to the machine frame for rendering the machine effective in side hill work.

A further object of my invention is to provide means for effecting such raising and lowering of the wheels without derangement of the traction wheels driving connections.

With the above and other objects in view the invention consists in the novel construction, combination and arrangement herein fully described, illustrated and claimed:

In the accompanying drawings:

Figure 1 is a plan view of the chassis of the improved farm tractor.

Fig. 2 is a side elevation of the machine.

Figure 3:
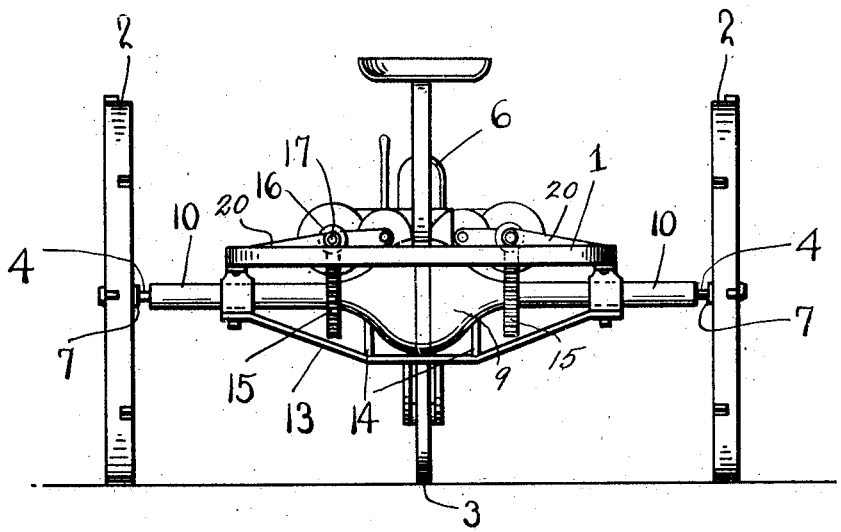
Fig. 3 is a rear elevation of the same.
Figure 4:
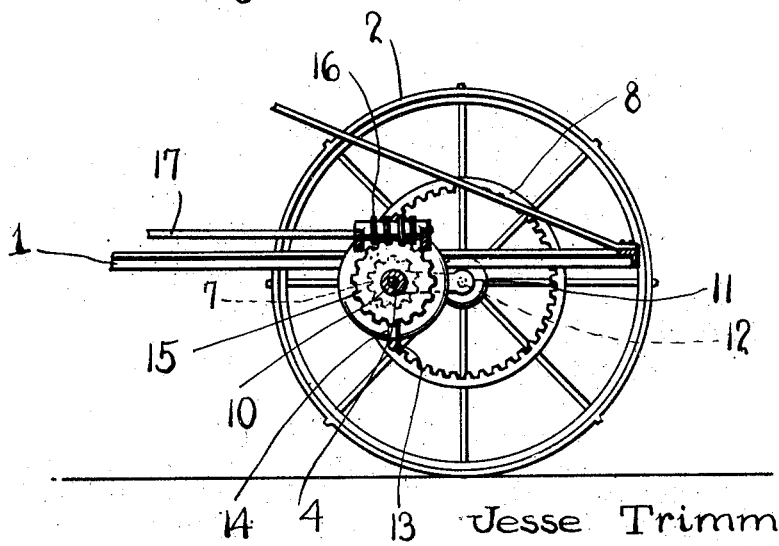
Fig. 4 is a fragmentary vertical longitudinal section through the same.

The improved farm tractor embodies a frame 1, which in the illustrated embodiment of the invention is supported adjacent the front by two driving traction wheels 2 and supported at the rear by a centrally located trailing wheel 3 adapted to function also as a steering wheel and to run in a furrow when plowing.

The driving axle 4 which is geared to the driving wheels 2 is of the motor vehicle type, comprising sections connected by differential gearing to which motion is imparted by suitable connecting means such as a drive shaft 5 coupled to an engine 6 on the frame 1. The ends of the axle 4 have fast thereon driving pinions or gears 7 which mesh with internal gears 8 on the traction wheels 2.

A housing 9 incloses the driving axle and comprises partially rotatable end sections 10 which abut against the central section and have at their outer ends angularly arranged arms 11, shown as extending in opposite directions and normally horizontal or nearly so. The arms 11 have spindles 12 on which the driving traction wheels are journaled. The internal gears 8 being concentric with relation to the spindles 12 insures a driving engagement between the gears 7 and 8 irrespective of the up and down movements of the arms 11.

The sections 10 of the axle housing are braced in any suitable way, as by means of a truss rod 13 and struts 14 to maintain the axle bearings in alinement.

To adjust the arms 11 up or down and correspondingly vary the elevation of the driving wheels with relation to the frame. I mount worm gears 15 fast on the rotatable axle housing sections 10 and employ worms 16 to turn said worm gears, the worms being mounted on and operated by worm shafts 17. The last named shafts are intended to be separably geared, as by clutches, to the engine so that the latter may be used to effect the adjustment of the wheels to hold the frame substantially in a horizontal position on a side hill of any given slope.

As illustrated particularly in Fig. 1, each shaft 17 is supported at its forward end by a U-shaped bracket 20 and is rotatably supported at its other end by an inwardly extended bracket 21 secured to the chassis by lateral flanges 22.

Other means may be employed for adjusting the arm 11 and the driving wheels thereon and it is not essential that the arms 11 extend exactly in opposite directions as they may be normally inclined either upwardly or downwardly. No matter to what extent the arms 11 are inclined or swung there is always a positive driving engagement between the gears 7 and 8.

Having thus described my invention what is claimed as new is:

A tractor, including a frame having a prime mover mounted thereon, a stationary axle housing carried by said frame and having its end portions independently rotatable and formed with integral crank arms, traction wheels journaled on said integral crank arms, an axle extending through said housing and having its end portions provided with gears beyond the rotatable sections of said housing, internal ring gears carried by said wheels and in mesh with the gears of said axle, and means whereby the arms of said rotatable housing section may be adjusted about the axis of the housing for adjusting the traction wheels vertically, said prime mover being connected to said axle.

In testimony whereof I affix my signature.

JESSE TRIMMER.